(12) United States Patent
Popokh et al.

(10) Patent No.: US 9,973,405 B2
(45) Date of Patent: May 15, 2018

(54) NETWORK ELEMENT STATUS IDENTIFICATION BASED ON SERVICE

(71) Applicant: Hewlett Packard Enterprise Development LP, Houston, TX (US)

(72) Inventors: Leonid Isaevich Popokh, Plano, TX (US); Marc Flauw, Les Ulis (FR); Jeffrey F. Edlund, Lees Summit, MO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 123 days.

(21) Appl. No.: 14/911,450

(22) PCT Filed: Aug. 30, 2013

(86) PCT No.: PCT/US2013/057739
§ 371 (c)(1),
(2) Date: Feb. 10, 2016

(87) PCT Pub. No.: WO2015/030829
PCT Pub. Date: Mar. 5, 2015

(65) Prior Publication Data
US 2016/0197808 A1   Jul. 7, 2016

(51) Int. Cl.
*H04L 1/00* (2006.01)
*H04L 12/26* (2006.01)
*H04L 12/24* (2006.01)

(52) U.S. Cl.
CPC ...... *H04L 43/0817* (2013.01); *H04L 41/5038* (2013.01); *H04L 41/5054* (2013.01)

(58) Field of Classification Search
CPC ............. H04L 43/0817; H04L 41/5038; H04L 41/5054
(Continued)

(56) References Cited

U.S. PATENT DOCUMENTS 6,745,242 B1 * 6/2004 Schick ................ H04L 12/2697
702/182
7,653,647 B2 * 1/2010 Borthakur ......... G06F 17/30067
707/687
(Continued)

FOREIGN PATENT DOCUMENTS

| CN | 103262470 A | 8/2013 |
| KR | 100176104 B1 | 5/1999 |
| WO | WO-2012177213 A2 | 12/2012 |

OTHER PUBLICATIONS

Clabby Analytics, "Openflow and SDN: Optimizing the Network for Greater Performance and User Control," (Research Paper), Mar. 2012, 8 pages, available at http://public.dhe.ibm.com/common/ssi/ecm/qcl12375usen/QCL12375USEN.PDF.
(Continued)

*Primary Examiner* — Faisal Choudhury
(74) *Attorney, Agent, or Firm* — Hewlett Packard Enterprise Patent Department (57) ABSTRACT

In one implementation, a set of path information may be retrieved from an inventory mechanism based on a service. A set of configuration information may be received from the inventory mechanism based on a network element. The network element status may be identified based on the set of configuration information.

18 Claims, 3 Drawing Sheets

(58) Field of Classification Search
USPC .......................................................... 370/248
See application file for complete search history.

(56) References Cited

U.S. PATENT DOCUMENTS

| | | | |
|---|---|---|---|
| 8,238,253 B2 | 8/2012 | Morrill | |
| 8,422,357 B1 | 4/2013 | Podolsky | |
| 8,549,133 B2* | 10/2013 | Vaver | H04L 41/0681 |
| | | | 709/224 |
| 8,929,203 B2* | 1/2015 | Ding | H04L 12/462 |
| | | | 370/217 |
| 2007/0088630 A1 | 4/2007 | MacLeod et al. | |
| 2009/0265459 A1* | 10/2009 | Hikichi | G06F 9/5055 |
| | | | 709/224 |
| 2011/0188403 A1 | 8/2011 | Calippe et al. | |
| 2011/0222413 A1* | 9/2011 | Shukla | H04L 43/0811 |
| | | | 370/241.1 |
| 2012/0182864 A1 | 7/2012 | Heinz et al. | |
| 2012/0284008 A1 | 11/2012 | Ennis | |
| 2012/0323633 A1 | 12/2012 | Chowdhary et al. | |
| 2013/0054775 A1 | 2/2013 | Lemus et al. | |
| 2013/0173810 A1 | 7/2013 | Subramaniam | |
| 2013/0212246 A1 | 8/2013 | Koponen et al. | |
| 2015/0055453 A1* | 2/2015 | Chaki | H04L 45/02 |
| | | | 370/225 |
| 2016/0134472 A1* | 5/2016 | Guan | H04L 41/0806 |
| | | | 709/222 |

OTHER PUBLICATIONS

International Search Report & Written Opinion received in PCT Application No. PCT/US2013/057739, dated May 26, 2014, 10 pages.
International Preliminary Report on Patentability received in PCT Application No. PCT/US2013/057739, dated Mar. 10 2016, 7 pages.
Open Networking Foundation (ONF) Software-Defined Networking: The New Norm for Networks, ONF White Paper, Apr. 13, 2012 (12 pages).
Open Networking Foundation, Conformance Testing Program, ONF Launches OpenFlow Conformance Testing Program dated on or before Aug. 15 2013 (2 pages).
Wikipedia, Software-defined networking last modified Aug. 4, 2013 (7 pages).
Office Action, CN Application No. 201380079243.2, dated Mar. 21, 2018, pp. 1-6, SIPO.

* cited by examiner

NETWORK ELEMENT STATUS IDENTIFICATION BASED ON SERVICE

BACKGROUND

Services related to computing and the telecommunication industry may be offered over a network of devices to route the service from one destination to another. The network of devices may encompass multiple networks. Service performance is commonly reviewed for quality service assurance and service fulfillment purposes. Service performance analysis may commonly use information of about the network by accessing elements of the network. Network element configuration information may be discovered by network management system requests. For example, a network element may receive a network management system request and reply with status of the network ports on the network element. The information received from each of the network elements may be collected into an inventory database. The inventory database may be used to form links and traffic flows among the network elements. The links and traffic flows may be correlated to provide services over the network.

DETAILED DESCRIPTION

In the following description and figures, some example implementations of systems and/or methods for identifying a network element status are described. Some examples are described specifically for use in a software-defined networking ("SDN") environment. However it should be noted that examples of network element status identification described herein may be utilized in a variety of appropriate systems and applications. In particular, a network element status identification system may identify the status of a network element in a network offering a service that is mapable to a network flow (or network path) and the network flow is mapable to network elements. Therefore, SDN environments are merely a potential use of the network element identification system. Thus any reference to SDN-specific elements and/or methods is merely included to provide context for specific examples described herein.

SDN-compatible networks may provide a service or multiple services to devices or other networks. As used herein, a service may be any appropriate supplying of communication, transmissions, software, storage, or any other product or activity that may be capable of running on a network of devices, or network elements. SDN-compatible networks may abstract the hardware of the system from the services being provided. For example, an SDN network may decouple the traffic control decisions from the physical systems that forward the network traffic. An SDN network may allow the service to be provided without regard to the underlying physical hardware. For example, a first network element may become latent from receiving too many requests and the SDN network may initiate the service to follow a different traffic flow through a second network element. As another example, the network element or a port of the network element may be malfunctioning and traffic may be rerouted. In both examples, the customer may not notice a change in service because the SDN controller may make the network decisions autonomously. In a network using SDN, the information of how the service gets to the customer is abstracted and a system administrator would be unaware as to what port or element may need repair or replacement.

Various examples described below relate to identifying a network status element based on a service. By using the service to obtain path information and network element configuration information, the status of the network element can be identified at any appropriate time.

Figure 1:
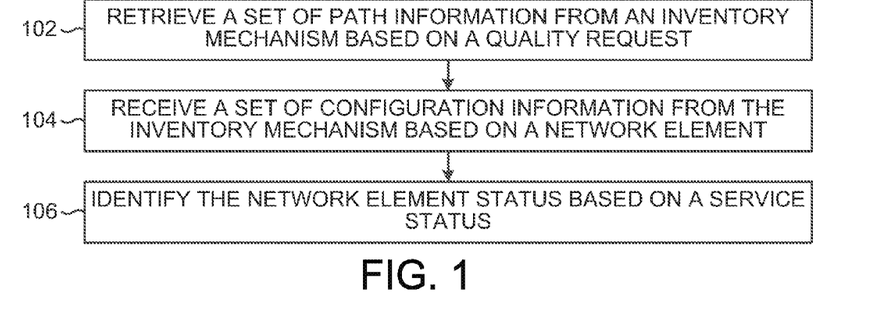
FIGS. 1 and 2 are block diagrams depicting example methods for identifying a network element status.
Figure 2:
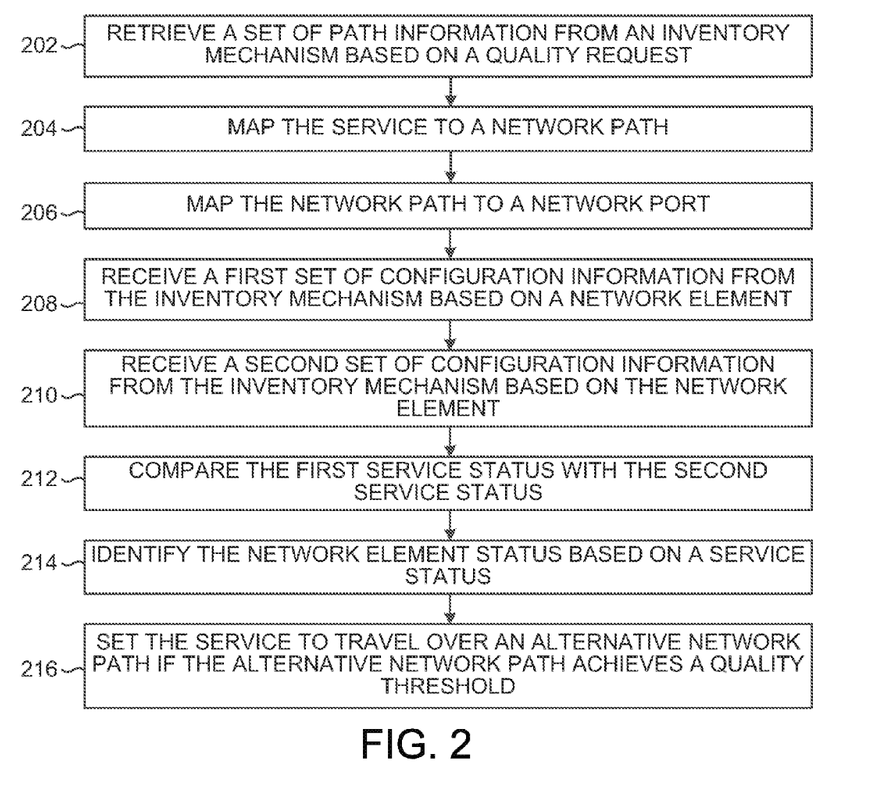

FIGS. 1 and 2 are block diagrams depicting example methods for identifying a network element status. Referring to FIG. 1, an example method for identifying a network element status may generally comprise retrieving a set of path information, receiving a set of configuration information, and identifying the network element status.

In block 102, a set of path information may be retrieved from an inventory mechanism based on a quality request. A quality request may be a request to check, or verify, the status of a service. The quality request may also be a request to determine the performance of the service, the performance of a network path, or an alternative network path as discussed herein. The quality request may initiate a request for a network path that is providing the service. The network path may be describable by a set of path information and the set of path information may be retrievable from an inventory mechanism that may have access to the set of path information. The set of path information and the inventory mechanism are described in more detail below and in the description associated with FIGS. 3-6.

As discussed above, an SDN network may dynamically change the network path providing the service. Therefore, the set of path information may be based on the current time or a time at which the service was provided over the network. Accordingly, the quality request may include a set of service information associated with the service and a time value.

The set of path information may be any appropriate data associated with a network path. For example, a set of path information may include a link between network elements, an Internet protocol ("IP") address and/or header, a network element, or any other appropriate information available from an SDN controller to provide a traffic flow through a network associated with the service.

An inventory mechanism may be any appropriate mechanism capable of retrieving information associated with the network, and, in particular, network elements of the network. The inventory mechanism may be able to retrieve information related to the network path and the configuration of the network elements of the network path. For example, the inventory mechanism may include at least one of a controller and a storage medium to contain at least one of the set of path information and a set of configuration information. The network element configuration, status, and other properties may be describable by the set of configuration information, as described in more detail with regards to block 104.

A network element may be any appropriate network device or module used in routing a service. For example, the network element may be a switch or a router. The network element may be included in the set of path information or otherwise inferable from the set of path information. The set of path information may be associated with the set of service information at a time associated with a time value.

The set of path information, the inventory mechanism, and the set of service information is discussed in more detail with regards to FIGS. 3-6. In particular, the inventory mechanism is discussed as an inventory operator 306 with regard to FIG. 3, an inventory engine 406 with regard to FIG. 4, and an inventory module 506 in regard to FIG. 5.

In block 104, a set of configuration information may be received from the inventory mechanism based on a network element, the set of service information, and the time value. The set of configuration information may be any appropriate data associated with a network element. For example, a set of configuration information may include a protocol, a metric, operation or connection information, a port, a buffer, and/or other information related to supporting a service on the network element. The set of configuration information may be stored in the inventory mechanism or otherwise retrievable by the inventory mechanism. For example, based on the set of path information, the inventory mechanism may be request the set of configuration information by making a request to a network element associated with the set of path information. The set of configuration information is discussed in more detail with regards to FIGS. 3-6.

In block 106, the network element status may be identified based on a service status. For example, if the service was down or latent at a time value and the SDN controller changed the network path to no longer route through a network element, the network element may be the cause and/or have the same status as the service at the time value. The service status may be based on the set of path information, the set of configuration information, and a time value. The service status may change as the service changes to adapt to the customer requests and/or the environment of the network. For example, if a service had an error message a time associated with the time value, the error message may have arose from a change in the set of path information and/or the set of configuration information. The network element, and the status of the network element, may be included in the set of path information or otherwise inferable from the set of path information and/or the set of configuration information. The set of path information may be associated with the set of service information at a time value.

The description of the example method for identifying a network element status of FIG. 1 may be applied to the description of the example method for identifying a network element status of FIG. 2. In particular, the description associated with blocks 102, 104, and 106 of FIG. 1 may be applied to blocks 202, 208, and 214 respectively, and, for brevity, are not repeated.

In block 204, the service may map to a network path. The mapping may be a correlation between the service and the network that describes the flow, or path, of the service over the network. For example, a set of service information may be mapped to a set of path information. The mapping may be maintained by the inventory mechanism mention in blocks 102 and 104 of FIG. 1. The set of path information may be any appropriate data associated with a network path as described in FIG. 1.

In block 206, the network path may map to a network port. The set of path information may represent a network path and may be mapped to a network element. For example, the set of path information may provide representation of a set of links where each link is between two network elements. The network element may be associated with a set of configuration information and may include a set of port information to determine a network element port status. For example, the set of configuration information may include a set of ports of the network element, and the set of port information may include the set of ports and the status of the set of ports, such as whether one of the set of ports is malfunctioning. The mapping may be maintained by the inventory mechanism mentioned in the description of blocks 102 and 104 of FIG. 1.

In block 208, a first set of configuration information may be received from the inventory mechanism based on a network element, and may be referred to as the set of configuration information as in the description of FIG. 1.

In block 210, a second set of configuration information may be received from the inventory mechanism based on the network element. The second set of configuration information may be any appropriate data associated with a network element as described herein with regards to the description associated with the first set of configuration information. The second set of configuration information may be associated with a second time value, a second network path, or otherwise different. The second set of configuration information may be associated or the same as the first set of configuration information. For example, if the second set of configuration information is the same as the first set of configuration, it may infer the network path is operational or that the SDN controller may be switching away from and back to a network path. In the latter case, a third set of configuration information associated with a third time value may be retrieved.

In block 212, the first service status may be compared to the second service status. The first service status may be based on a first set of path information, a first set of configuration information, and a first time value and the second service status may be based on a second set of path information, a second set of configuration information, and a second time value. The difference in service status may be attributable to the difference in traffic flow and/or a network element.

The first service status may be the same as the second service status and it may be inferred that the status of the service has been consistent between a first time value and a second time value. Alternatively, the first service status may be different from the second service status and a malfunction or other operational status may be inferred. A network degradation of at least one of the network element and the network path may be determined by comparing the first service status to the second service status. For example, if the network path is different between the first service status and the second service status, it may be inferred that a network element that is in the network path at the time of the first service, and not in the second, may have malfunctioned or otherwise not operated in a preferred state. Alternatively, the service status or network degradation may be retrievable from one set of service status information and the network degradation may be received or otherwise determinable by at least one of a set of path information and a set of configuration information.

In block 216, the service may be set to travel over an alternative network path if the alternative network path achieves a quality threshold. The alternative network path may be a traffic flow with a link or port that is different from the network path associated with the quality request. The alternative network path may be determined based on the set of configuration information. For example, the set of configuration information may provide that a number of ports are designated for use by the service. The alternative network path may be tested based on a quality benchmark. The test may ensure that the alternative network path has sufficient quality and/or performance to provide the service to meet the customer's requests or otherwise based on a service level agreement ("SLA"). The quality benchmark may be a test regarding quality of service, such as packet loss frequency, and the quality benchmark may be based on an SLA. The quality threshold may be based on the quality benchmark of the test performed on the alternative network path. The quality threshold may be a minimum value, a maximum value, or a range of values appropriate for performance of the service according to an SLA.

Figure 3:
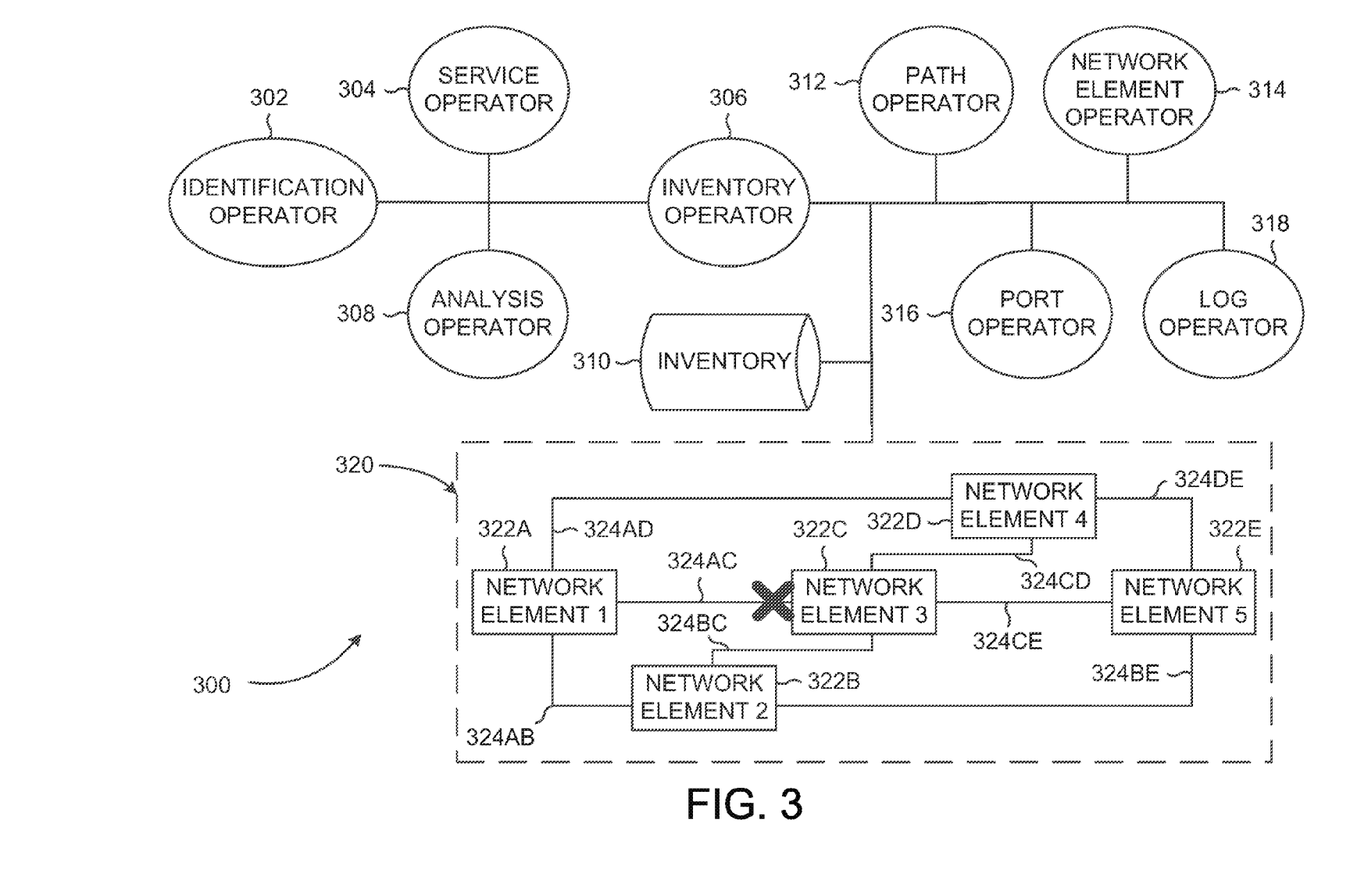
FIG. 3 depicts example operations for identifying a network element status.

FIG. 3 depicts example operations for identifying a network element status. The example operations described herein may be examples of a method and/or a system 300 for identifying a network element status.

The identification operator 302 may identify the status of the network and/or a network element. A quality request may be initiated or received by an identification operator 302. The identification operator 302 may request information associated with a service. A set of service information associated with the service may be received by the identification operator 302 in a quality request or retrievable from a service operator 304. The identification operator 302 may retrieve data associated with the network from the inventory operator 306 based on the set of service information associated with the service. For example, the identification operator 302 may retrieve a first set of path information and a second set of path information and compare them to infer that there may be an operational issue with a network element that is in one of the first set of path information and the second set of path information, but not in the other. The identification operator 302 may use that inference to determine a network element status of the network element and/or retrieve more information to determine the network element status.

The service operator 304 may retain or otherwise contain information associated with a service and the network 320 on which the service may be provided. The service operator 304 may utilize an inventory operator 306 and/or an analysis operator 308 to maintain the set of service information. The set of service information may include any appropriate data associated with the service. For example, the set of service information may include a service label, a service type, a service protocol, a service status, a time value, and/or a set of customer information.

The network 320 may include network elements and links between network elements. For example, the network 320 may include network elements 322A-322E and the links 324AB-324DE as shown in FIG. 3. The service may operate over a network path of the network 320 and the network path may be a combination of links to provide the service from a first network element to a second network element. For example, the network path from network element 322A to network element 322E may include links 324AD and 324DE and a network element 322D may be an intermediary node. The references of the links in FIG. 3 are labeled to denote the network elements connected by the link. For example, the link referenced as 324AC is a link between network element 322A and network element 322C.

The analysis operator 308 may use computations to infer data associated with a service, a network path, a network element, or a port of a network element. For example, the analysis operator 308 may use pattern recognition computations to determine the traffic flow of the service over the network 320 includes the link from network element 322B to network element 322C. The operations of the identification operator 302, the service operator 304, the analysis operator 308, and the inventory operator 306 are discussed in further detail in the description associated with FIGS. 4-6.

The inventory operator 306 may maintain data associated with the network 320. For example, the inventory operator 306 may maintain data associated with an IP layer, a multiprotocol label switching ("MPLS") layer, transport layer, and/or any other appropriate layer, or combination of layers, of the network 320. The inventory operator 306 may retrieve the data associated with the network from an inventory 310 or by directly accessing a network element of the network 320. The inventory operator 306 may be part of, or work in conjunction with, a controller of the network. For example, the inventory operator 306 may request the status of a network element from an SDN controller. In that example, the SDN controller may make a request directly to the network element or may look up the status in a storage medium of the SDN controller.

The inventory 310 may be a medium capable of storing information associated with the network. The inventory 310 may include a log, database, or other structure for storing data associated with the network. For example, the inventory 310 may be a log that stores the changes in network paths as conducted by an SDN controller. The inventory 310 may contain information related to network elements, connections, services, and other information to useable to manage the topology of the network 320. For example, the inventory 310 may include links, nodes, and ports used to get the service from a first network element to a second network element. The inventory 310 may contain information related to the status of a service, a network element, and/or a port. The inventory 310 may be distributed across devices. For example, the inventory 310 may be distributed across SDN controllers or storage mediums.

The inventory operator 306 may utilize an operator to obtain information and/or update the inventory 310. Example operators that may be used by the inventory operator 306 include a path operator 312 configured to obtain a set of path information from the inventory 310 and/or network 320, a network element operator 314 configured to obtain a set of configuration information from the inventory 310 and/or network 320, a port operator 316 configured to obtain a set of port information from the inventory 310 and/or network 320, and a log operator 318 configured to retain data associated with the network 320 in the inventory 310. Alternatively, the inventory operator 306 may be configured to perform the operations of any other operators discussed herein.

The inventory operator 306 may perform retrieval of information based on a set of service information and a time value. The inventory operator 306 may retrieve information associated with the network elements used by the service at the time associated with the time value. If no time value is provided, the inventory operator 306 may be configured to retrieve a current set of configuration information of a network element providing the service or a set of configuration information at the time of the last change in the network path.

The inventory operator 306 may be configured to retrieve additional sets of information. For example, if a first set of path information associated with a first network path changed to a second set of path information associated with a second network path, the inventory operator 306 may be configured to retrieve a first set of configuration information associated with the first set of path information and a second set of configuration information associated with the second set of configuration information.

Figure 4:
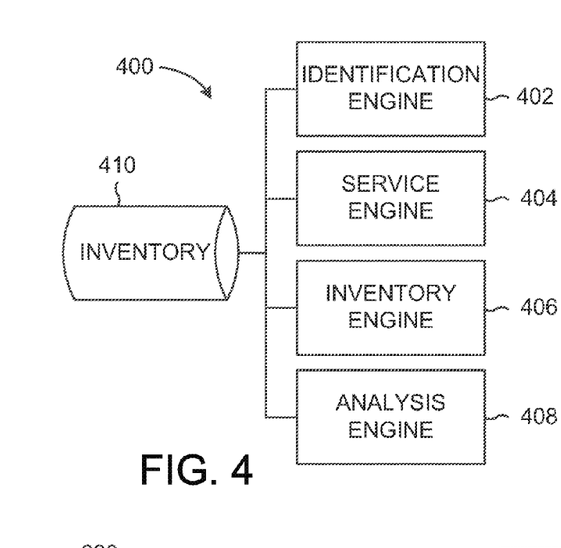
FIGS. 4 and 5 are block diagrams depicting example systems for identifying a network element status.

In general, the operators 302, 304, 306, and 308 of FIG. 3 described above represent operations, processes, interactions, and/or other actions performed by or in connection with the engines 402, 404, 406, and 408 of FIG. 4.

Figure 5:
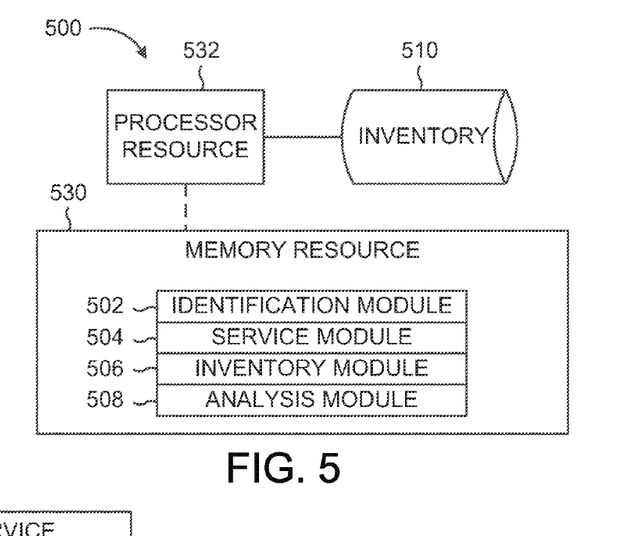

FIGS. 4 and 5 are block diagrams depicting example systems for identifying a network element status. Referring to FIG. 4, an example system 400 for identifying a network element status may generally include an identification engine 402, a service engine 404, an inventory engine 406, an analysis engine 408, and an inventory 410. The inventory 410 may be the same as the inventory 310 of FIG. 3 and the description associated with the inventory 310 may be applied to the inventory 410, and vice versa, as appropriate.

The identification engine 402 may represent any combination of hardware and programming configured to identify a network element of the set of configuration information for a quality check, or a status verification. The identification engine 402 may identify a network element of a network and the status of the network element based on a service. The service may be describable by a set of service information provided by a quality request. The network element may provide, have provided, or capable of providing the service. The identification engine 402 may identify the status of the network element based on a time value. The identification engine 402 may use information from the service engine 404, the inventory engine 406, and/or the analysis engine 408 to identify the network element and the status of the network element. The identification engine 402 may be configured to compare information received from the engines 404, 406, and 408. The identification engine 402 may be configured to infer status information as described herein. The identification engine 402 may be configured to return the status of the network element and/or an alternative network path to provide the service over a network.

The service engine 404 may represent any combination of hardware and programming configured to determine a set of path information based on a quality request. The service engine 404 may associate a set of customer information with a set of service information. The set of customer information may be any appropriate data associated with customer. For example, the set of customer information may include a customer name and a list of services provided to the customer. The set of service information may be any appropriate data associated with a service. For example, the set of service information may include the status of the service and the source of the service. The service engine 404 may associate the set of service information with a network path, or flow, describable by a set of path information. The service engine 404 may utilize the inventory engine 406 to obtain or otherwise determine the set of path information.

The inventory engine 406 may represent any combination of hardware and programming configured to map the set of path information to a set of configuration information based on the set of service information. The inventory engine 406 may be coupled to an inventory 410 of the network providing the service. The set of configuration information may be retrievable from the inventory 410 by the inventory engine 406. Alternatively, the set of configuration information may be retrievable by a direct request to a network element that is identifiable by the set of path information or a combination of request to a network element and request to an inventory 410.

The inventory engine 406 may retrieve the set of configuration information associated with the network path based on the set of service information and the time value. The time value and the set of service information may allow the inventory engine 406 to associate the set of configuration information with a network element of a network path based on the set of service information.

The inventory engine 406 may be configured to log the set of path information and the set of configuration information based on at least one of a schedule, a path change, and a degradation notification. The schedule may include a designated time period or time interval at which the inventory engine 406 may store the set of path information and the set of configuration information associated with the service at the time associated with the time period or interval. For example, the inventory engine 406 may add and/or update the inventory on a 5 minute interval. The path change may be any modification in the traffic flow, or network path. For example, the SDN controller may decide to change the network path to maintain service and the inventory engine 406 may log the network path upon making that change. The degradation notification may be a message from a network element, monitor, or module associated with monitoring the network and/or service. For example, a service monitor may determine that the service request completion time has increased and the inventory engine 406 may log the set of path information and the set of configuration information upon receiving the degradation notification from the service monitor.

The inventory engine 406 may be configured to discover the set of configuration information from at least one of a learning table, a log file, a monitor, the analysis engine, and a service-to-port communication. A learning table may be a data structure adapted to learn the flow of traffic as service requests are received and completed. A log file may be any appropriate data structure capable of storing time values and information associated with the network, such as a set of configuration information or a set of path information. A monitor may be a module capable of monitoring the service, the network, and/or a network element. The analysis engine 408 may perform the operations discussed in regards to the analysis operator 308 of FIG. 3 and is also discussed in more detail below. A service-to-port communication may include any appropriate direct communication with a network element to discover what service is being provided and at which port. For example, the inventory engine 406 may use a network management system request to query a network element or a series of network elements. The service-to-port communication may include any requests to enable the inventory engine 406 to obtain information that may not be included in the inventory 410 or not inferable from information in the inventory 410. The inventory engine 406 may be configured to infer the set of configuration information from at least one of the learning table, the log file, the monitor, the analysis engine, and the service-to-port communication. An inference may be a reasonable interpretation, whether an interpolation or an extrapolation, of a condition or existence of a network element or property of a network element. For example in FIG. 3, if network elements 322A, 322B, 322C, and 322E are designated to provide the service, and network element 322C is known to be offline, a reasonable inference may be that the traffic flow for the service includes links 324AB and 324BE because that would be an available path from network element 322A to network element 322E.

The inventory engine 406 may be part of or include a controller or other device used in managing the network or otherwise capable of discovering the information of the network. For example, the inventory engine 406 may include at least one of a SDN controller, a SDN network device, a service-aware controller, a service-aware network device, and a data analysis mechanism, such as analysis engine 408 described below. The network devices discussed above may contain or otherwise act like a controller in accordance with the controllers described herein.

The inventory engine 406 may retrieve the set of configuration information from a network based on an application programming interface ("API") to provide automated inventory discovery and management of the network. For example, the service may be provided over multiple networks, including a service provider that may maintain service separate from the system 400. The inventory engine 406 may be configured to retrieve the set of configuration information from the network owned by the service provider by using an API provided by the service provider. For example, the service provider may provide an API to allow the SDN controller to move the traffic flow to the network of the service provider, and the information about the traffic flow may be automatically retrievable upon shifting the traffic flow into the network of the service provider. The API may provide for automatic or otherwise self-servicing inventory discovery and management.

The inventory engine 406 may communicate the set of configuration information to the service engine 404. The inventory engine 406 may provide additional sets of configuration information and the service engine 404 may provide an alternative network path through the network based on a set of configuration information and the status of the network element.

The analysis engine 408 may represent any combination of hardware and programming configured to analyze network traffic based on a pattern analysis operation. For example, the analysis engine 408 may use stream processing to compute sequential pattern analysis of events of the network to determine a traffic flow of the service. Based on the time value and the set of service information, the analysis engine 408 may at least one of discover the network element of the network path and infer the network element of the network path. The analysis engine 408 may use the inventory engine 406 to obtain information to analyze. The analysis engine 408 may be used in conjunction with the engines 402, 404, and 406 to discover or infer information associated with the network.

FIG. 5 depicts that the example system 500 for identifying a network element status may be implemented on a memory resource 530 operatively coupled to a processor resource 532. The processor resource 532 may be operatively coupled to the inventory 510. The inventory 510 may be the same as the inventory 310 of FIG. 3 and/or the inventory 410 of FIG. 4 and the description associated with the inventory 310 and/or the inventory 410 may be applied to the inventory 510, and vice versa, as appropriate.

Referring to FIG. 5, the memory resource 530 may contain a set of instructions that may be executable by the processor resource 532. The set of instructions may implement the system 500 when executed by the processor resource 532. The set of instructions stored on the memory resource 530 may be represented as an identification module 502, a service module 504, an inventory module 506, and an analysis module 508. The processor resource 532 may carry out the set of instructions to execute the identification module 502, the service module 504, the inventory module 506, the analysis module 508, and/or any appropriate operations between or otherwise associated with the modules of the system 500. For example, the processor resource 532 may carry out a set of instructions to identify a status of a network element based on a time value, associate a set of service information with a network path, and retrieve a set of configuration information associated with the network path based on the set of service information and the time value. The identification module 502 may represent program instructions that when executed function as the identification engine 402 of FIG. 4. The service module 504 may represent program instructions that when executed function as the service engine 404 of FIG. 4. The inventory module 506 may represent program instructions that when executed function as the inventory engine 406 of FIG. 4. The analysis module 508 may represent program instructions that when executed as the analysis engine 408 of FIG. 4.

The processor resource 532 may be one or multiple central processing units ("CPU") capable of retrieving instructions from the memory resource 530 and executing those instructions. The processor resource 532 may process the instructions serially, concurrently, or in partial concurrence, unless described otherwise herein.

The memory resource 530 and the inventory 510 may represent a medium to store data utilized by the system 500. The medium may be any non-transitory medium or combination of non-transitory mediums able to electronically store data and/or capable of storing the modules of the system 500 and/or data used by the system 500. The medium may be machine-readable, such as computer-readable. The data of the inventory 510 may include representations of a service, a network path, a network element, a time value, and/or other data or information mentioned herein, such as a configuration, a property, or a status of any of the above.

In the discussion herein, engines 402, 404, 406, and 408 and the module 502, 504, 506, and 508 have been described as combinations of hardware and programming. Such components may be implemented in a number of fashions. Looking at FIG. 5, the programming may be processor executable instructions stored on the memory resource 530, which is a tangible, non-transitory computer readable storage medium, and the hardware may include processor resource 532 for executing those instructions. The processor resource 532, for example, may include one or multiple processors. Such multiple processors may be integrated in a single device or distributed across devices. For example in reference to FIG. 6, the processor resource 532 may be distributed across any combination of server devices 692 and client devices 694. The memory resource 530 may be said to store program instructions that when executed by processor resource 532 implements the system 500 in FIG. 5. The memory resource 530 may be integrated in the same device as processor resource 532 or it may be separate but accessible to that device and processor resource 532. The memory resource 530 may be distributed across devices, such as server devices 692 and client devices 694 of FIG. 6. The memory resource 530 and the inventory 510 may represent the same physical medium unless otherwise described herein.

In one example, the program instructions may be part of an installation package that when installed may be executed by processor resource 532 to implement the system 500. In this case, memory resource 530 may be a portable medium such as a CD, DVD, or flash drive or memory maintained by a server device, such as server device 692 of FIG. 6, from which the installation package may be downloaded and installed. In another example, the program instructions may be part of an application or applications already installed. Here, the memory resource 530 may include integrated memory such as a hard drive, solid state drive, or the like.

Figure 6:
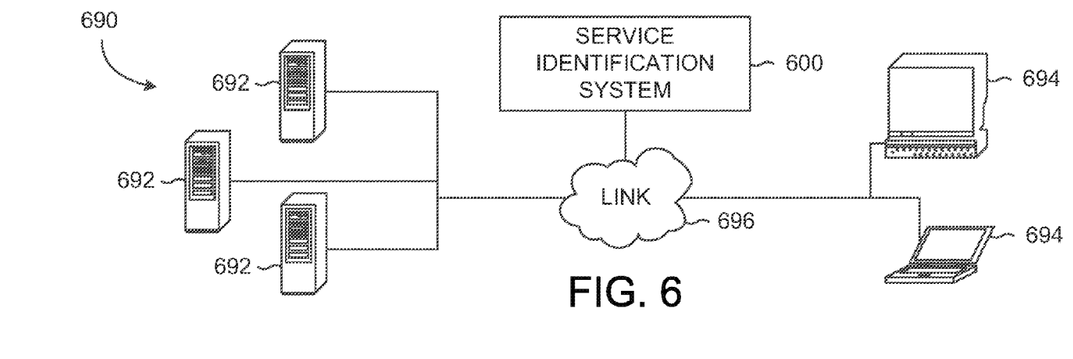
FIG. 6 depicts example environments in which various examples for identifying a network element status may be implemented.

FIG. 6 depicts example environments in which various examples for identifying a network element status may be implemented. The environment 690 is shown to include a service identification system 600 for identifying a network element status. The system 600 described herein with respect to FIGS. 4 and 5, may represent generally any combination of hardware and programming configured to identify a network element status. The system 600 may be integrated into a server device 692 or a client device 694. The system 600 may be distributed across server devices 692, client devices 694, or a combination of server devices 692 and client devices 694.

In the example of FIG. 6, a client device 694 may access a server device 692. The server devices 692 may represent generally any computing devices configured to respond to a network request received from the client device 694. A server device 692 may include a web server, an application server, or a data server. The client devices 694 may represent generally any computing devices configured with a browser or other application to communicate such requests and receive and/or process the corresponding responses. A link 696 may represent generally one or any combination of a cable, wireless, fiber optic, or remote connections via a telecommunications link, an infrared link, a radio frequency link, or any other connectors of systems that provide electronic communication. The link 696 may include, at least in part, intranet, the Internet, or a combination of both. The link 696 may also include intermediate proxies, routers, switches, load balancers, and the like. The description of link 696 may be applied to the links of FIG. 3.

Referring to FIGS. 4-6, the engines 402, 404, 406, and 408 and/or the module 502, 504, 506, and 508 may be distributed across any combination of server devices, client devices, and storage mediums. The engines 402, 404, 406, and 408 and/or the module 502, 504, 506, and 508 may complete or assist completion of operations performed in describing another engine 402, 404, 406, and 408 and/or the module 502, 504, 506, and 508. The engines 402, 404, 406, and 408 and/or the module 502, 504, 506, and 508 may perform the example operations of operators 302, 304, 306, and 308 and/or the example methods described in connection with FIGS. 1 and 2.

Although the flow diagrams of FIGS. 1 and 2 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A method executed by a system comprising a processor for identifying a network element status comprising:
    retrieving a set of path information from an inventory mechanism based on a quality request, the quality request including a set of service information associated with a service and a time value, the set of path information including information of a network element, the inventory mechanism including at least one of a controller and a storage medium to contain at least one of the set of path information and a set of configuration information;
    receiving the set of configuration information from the inventory mechanism based on the network element, the set of service information, and the time value; and
    identifying the network element status based on a service status, the service status based on the set of path information, the set of configuration information, and the time value.

2. The method of claim 1, comprising:
    mapping the set of service information to the set of path information, the set of path information associated with a network path; and
    mapping the set of path information to the network element, wherein the set of configuration information is associated with the network element and includes a set of port information to determine a network element port status.

3. The method of claim 2, further comprising determining a network degradation of at least one of the network element and the network path.

4. The method of claim 3, wherein determining the network degradation comprises comparing a first service status with a second service status, wherein:
    the first service status is based on the set of path information, the set of configuration information, and the time value; and
    the second service status is based on a second set of path information, a second set of configuration information, and a second time value.

5. The method of claim 3, comprising:
    determining an alternative network path based on the set of configuration information;
    testing the alternative network path based on a quality benchmark; and
    setting the service to travel over the alternative network path if the alternative network path achieves a quality threshold, the quality threshold based on the quality benchmark.

6. The method of claim 1, wherein the set of configuration information retrieved from the inventory mechanism comprises information of a protocol used to support the service.

7. The method of claim 1, further comprising receiving the quality request that is a request to check a status of the service.

8. A system comprising:
    a processor; and
    a non-transitory storage medium storing service instructions, inventory instructions, and identification instructions,
    the service instructions executable on the processor to determine a set of path information based on a quality request, the quality request including a set of service information;
    the inventory instructions executable on the processor to:
        map the set of path information to a set of configuration information based on the set of service information, the inventory instructions coupled to an inventory of a network, the set of configuration information retrievable from the inventory, and
        log the set of path information and the set of configuration information based on at least one of a schedule, a path change, and a degradation notification; and
    the identification instructions executable on the processor to identify a network element of the set of configuration information for a quality check.

9. The system of claim 8, further comprising at least one of a software-defined network ("SDN") controller, a SDN network device, a service-aware controller, a service-aware network device, and a data analysis mechanism.

10. The system of claim 8, further comprising analysis instructions executable on the processor to analyze network traffic based on a pattern analysis operation, wherein the inventory instructions are executable on the processor to discover the set of configuration information from at least one of a learning table, a log file, a monitor, the analysis engine, and a service-to-port communication.

11. The system of claim 10, wherein the inventory instructions are executable on the processor to infer the set of configuration information from at least one of the learning table, the log file, the monitor, the analysis engine, and the service-to-port communication.

12. The system of claim 8, wherein the determined set of path information is a first set of path information for a first time, and wherein the service instructions are executable on the processor to:
   compare the first set of path information for the first time with a second set of path information for a second time different from the first time; and
   identify an operational issue of the network element based on the comparing.

13. The system of claim 8, wherein the service instructions are executable on the processor to:
   map the set of service information to the set of path information; and
   identify a network path from the set of path information, the identified network path used to provide a service associated with the set of service information.

14. A non-transitory machine readable medium storing instructions that when executed cause a system comprising a processor to:
   identify a status of a network element based on a time value;
   associate a set of service information with a network path, the set of service information associated with a service;
   retrieve a set of configuration information associated with the network path from an inventory based on the set of service information and the time value; and
   based on the time value and the set of service information, at least one of discover the network element of the network path and infer the network element of the network path.

15. The non-transitory machine readable medium of claim 14, wherein the instructions when executed cause the system to:
   associate customer information with the service; and
   associate the set of configuration information with the network element of the network path based on the set of service information.

16. The non-transitory machine readable medium of claim 14, wherein the instructions when executed cause the system to retrieve the set of configuration information based on an application programing interface to provide automated inventory discovery and management of a network including the network path.

17. The non-transitory machine readable medium of claim 16, wherein the instructions when executed cause the system to provide an alternative network path through the network based on the set of configuration information and the status of the network element.

18. The non-transitory machine readable medium of claim 14, wherein the time value is a first time value, and the set of configuration information is a first set of configuration information, and wherein the instructions when executed cause the system to:
   receive a second set of configuration information for a second time value different from the first time value; and
   based on detecting a difference between the first set of configuration information and the second set of configuration information, determine an operational status of the network path.

\* \* \* \* \*